United States Patent Office 3,497,470
Patented Feb. 24, 1970

3,497,470
POLYPHENOLS AND PROCESS FOR
MANUFACTURE THEREOF
Arsene Isard, Saint-Genis-Laval, and Francis Weiss,
Pierre-Benite, France, assignors to Ugine Kuhlmann, Paris, France, a company of France
No Drawing. Continuation-in-part of application Ser. No.
605,175, Dec. 28, 1966. This application Oct. 23, 1967,
Ser. No. 677,069
Claims priority, application France, Oct. 24, 1966,
81,278
Int. Cl. C08g *23/20*
U.S. Cl. 260—47  3 Claims

ABSTRACT OF THE DISCLOSURE

Isomeric rearrangement of polyethers having the general formula

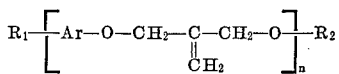

accomplished by heating the polyethers at a temperature in the range from about 150°–300° C. produces new polyphenols having substantially the same molecular weight as the polyether employed in the reaction and having elements which are equivalent to monomeric products of equivalent structure which have undergone rearrangement. In the general formula, Ar represents a divalent radical having at least one aromatic nucleus and which is derived from a diphenol of the form HO—Ar—OH, in which at least one ortho or para position with respect to each OH function is not substituted; $R_1$ represents a radical selected from the group consisting of

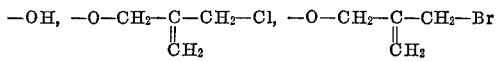

and

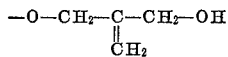

$R_2$ represents a radical selected from the group consisting of

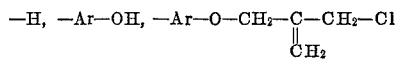

and

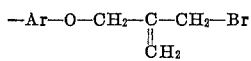

$n$ is an integer in the range from about 2 to 30.

CROSS REFERENCES TO RELATED APPLICATION

This application is a continuation-in-part of our copending U.S. application Ser. No. 605,175, filed Dec. 28, 1966.

BACKGROUND OF THE INVENTION

Field of the invention

This invention relates to the production of novel polyphenols by the isomeric rearrangement of aromatic polyethers derived from a diphenol of the form HO—Ar—OH, in which Ar is a divalent radical having at least one aromatic nucleus and in which at least one ortho or para position with respect to each —OH function is not substituted.

Description of the prior art

Claisen rearrangements of aryl allyl ethers such as the rearrangements of phenyl allyl ether to o-allyl phenol and 2,6-dimethylphenyl allyl ether to p-allyl-2,6-dimethylphenol are well known. The rearrangement is characterized by the presence of an allylic double bond for each aryl ether group.

SUMMARY OF THE INVENTION

We have found that the thermal rearrangement of aromatic polyethers which are derived from a diphenol of the form HO—Ar—OH, in which Ar is a divalent radical having at least one aromatic nucleus and in which at least one ortho or para position with respect to each —OH function is not substituted, may be successfully carried out to produce novel polyphenols. According to the invention, the method of isomerically rearranging these aromatic polyethers comprises heating the polyethers at a temperature in the range of about 150°–300° C. to promote an isomeric rearrangement. The aromatic polyethers have the general formula

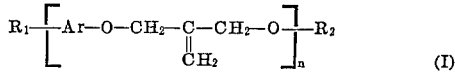  (I)

wherein (a) Ar is a divalent radical having at least one aromatic nucleus and which is derived from a diphenol of the form HO—Ar—OH, in which at least one ortho or para position with respect to each OH function is not substituted (b) $R_1$ represents a member of the group consisting of

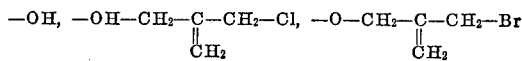

and

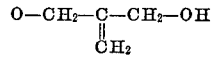

(c) $R_2$ represents a member of the group consisting of

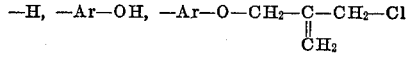

and

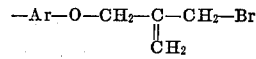

and (d) $n$ is an integer in the range from about 2 to 30.

The products of the thermal isomeric rearrangement are polyphenols having substantially the same molecular weight as the aromatic polyethers employed in the reaction and have elements which are equivalent to monomeric products of equivalent structure which have undergone rearrangement.

By way of illustration, the course of rearrangement of a polyether (II) obtained from Bisphenol-A in the manner of the present invention is represented schematically as follows:

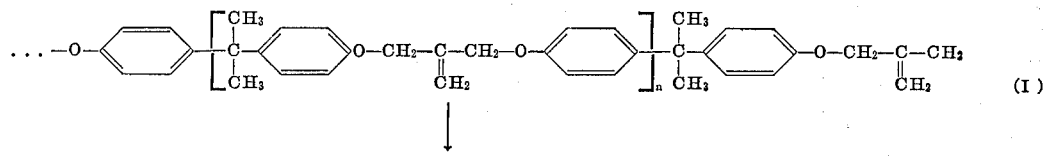  (I)

The polyether (II) is rearranged into one or both of the polyphenols (III) and (IV):

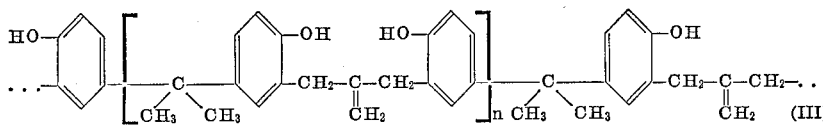

(III)

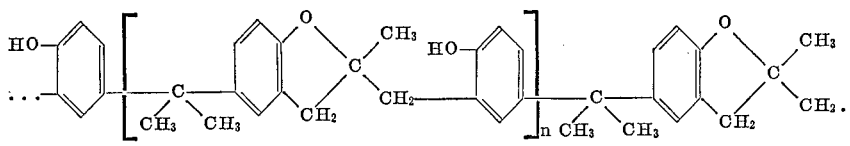

(IV)

Inherent in the manner of effecting the rearrangement according to the present invention is the possibility that both structures III and IV may coexist in the same macromolecule together with intact elements of ether structure.

The novel polyphenols obtained by the method of the present invention are similar in their general characteristics to the phenolic resins known as "novolaks" which are obtained by the reaction of phenol and formaldehyde. These new polyphenols may be used as constituents of paints and varnishes, as binders in laminar structures such as papers, fabrics and wood, and they may also be used as adhesives and as components in cast resins, molding powders and the like.

DESCRIPTION OF THE PREFERRED PRACTICE OF THE INVENTION

The above-described rearrangements are similar to those described in our copending U.S. application No. 605,175 pertaining to new phenols and their method of manufacture. There are described therein the di-(o-hydroxy-aryl) - 1,3 methylene - 2 propanes and the methyl - 2 - (o-hydroxybenzyl)-2 coumarans which are obtained by thermally rearranging the diaryloxy-1,3 methylene-2 propanes by heating them to a temperature between about 150°–300° C. in the course of a reaction which appears to be related to the Claisen rearrangement and which appears to be subject to similar requirements concerning the effect of substitution of the nuclei and concerning starting conditions.

Thus, in thermally rearranging a diaryloxy-1,3-methylene-2 propane by heating it to a temperature between about 150°–300° C., if the ortho positions are free the new polymer contains components having the structure of bis (o-hydroxyaryl)-1,3 methylene-2 propane (structure III) and/or the structure of methyl-2 (o-hydroxybenzyl)-2 coumaran (structure IV). If the rearrangement is of the para type the resultant new components have a structure of bis (p-hydroxyaryl)-1,3 methylene-2 propane (structure V).

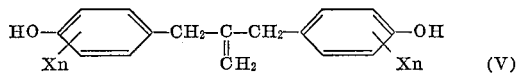 (V)

There thus appear, for each structural component having undergone rearrangement, one or two phenol functions in the polymer molecule.

Thus, the present invention is based on the discovery that by heating a polyether which conforms to the general structure I, an isomeric rearrangement is provoked which leads to the formation of an isomeric polyphenol of structure (III) or (V) or a substituted monophenol with coumaran structure as illustrated by Formula IV. Although the thermal isomeric rearrangement of this invention in certain aspects is similar to Claisen rearrangements, the results of the thermal reaction, however, cannot be predicated on the well known Claisen rearrangement mechanism. The starting materials, 1,3 di-(aryloxy) 2-methylene propanes, for the polyethers of this invention have only one allylic double bond for two arylether groups:

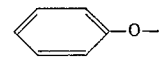

The double bond, therefore, must participate in the rearrangement of both arylether groups.

The polyethers which constitute the starting material in accordance with the present invention are prepared by reacting, in the presence of an alkaline agent, the diphenol HO—Ar—OH with a dihalogeno-1,3 methylene-2 propane and more particularly dichloro-1,3 or dibromo-1,3 or chloro-bromo-1,3 methylene-2 propane. Among the diphenols which can be used are the various dihydroxy benzenes including catechol, resorcinol, hydroquinone, the 4-4' dihydroxy diphenyl alkanes, especially those which are obtained by a reaction of phenol with an aldehyde or ketone, which have the following form

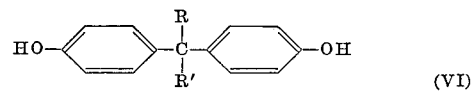 (VI)

in which R and R' represent preferably an atom of hydrogen or an aliphatic, alicyclic or aromatic hydrocarbon radical possessing from about 1 to 12 carbon atoms. The best known representative of this class of radicals is Bisphenol-A (4-4' bihydroxydiphenyl)-2,2 propane in which both R and R' represent a $CH_3$ radical. Other types of diphenols which may be employed herein are the diphenols described in our copending U.S. application No. 605,175, as far as the requirement of having at least one unsubstituted o- or p-position to each OH group is fulfilled.

Where the two reactants, diphenol and halogenated derivatives, are employed or reacted in strictly stoichiometric proportions, or where one of the two is present in slight excess, and, similarly, where the terminal halogenated functions remain intact or undergo saponification in the alkaline medium, the terminal groups $R_1$ and $R_2$ of the polyethers will take on the previously indicated form. Preferably the reactants are employed in quantities close to stoichiometric amounts, i.e. $1\pm0.2$ mol of diphenol per mol of the dihalogeno-1,3 methylene-2 propane. The quantity of the alkaline agent must be sufficient to combine the halogenated ions liberated by the reactions i.e. at least two equivalents per mol of dihalogeno-1,3 methylene-2 propane. The preferred alkaline agents are the hydroxides and carbonates of alkaline or alkaline earth metals, notably sodium, potassium and calcium.

The reaction may be carried out in the absence of a solvent, as, for example, by heating the reactants to the boiling point of the mixture. It is also possible to operate in the presence of an inert solvent or diluent such as methanol, ethanol, isopropanol, a butanol, acetone, dioxane, or an aliphatic or aromatic hydrocarbon boiling between fifty and two hundred degrees C. at atmospheric pressure. The reaction is preferably carried out at a temperature above ambient, and in particular between about fifty and two hundred degrees C.

These polyethers in addition to being the starting material for the novel polyphenols of this invention are useful as plasticizers for vinyl resins and as intermediates in the preparation of synthetic resins.

The preparation of a polyether as indicated hereinabove is described in Example I.

EXAMPLE I

This example describes the preparation of a polyether from dichloro-1,3 methylene-2 propane and bisphenol-A.

A mixture of 72 g. (0.316 mol) of bisphenol-A, 44 g. (0.35 mol) of dichloro-1,3 methylene-2 propane and 138 g. (1 mol) of sodium carbonate was heated in reflux for 56 hours. The mass was then poured into cold water, and there was obtained a white pulverulent solid, which was filtered and washed. There was obtained 86 g. of a product melting at 110°–120° C., whose analysis established the following:

No phenol function;
Double ethylenic bond: 0.325 equivalents per 100 grams;
Chlorine content: 1.8% by weight;
Molecular weight: 1100–1150 as determined by cryoscopy in benzene.

The following example illustrates the production of the novel polyphenols of this invention by the thermal rearrangement of the product of Example I.

EXAMPLE II 40 grams of a polyether produced in accordance with Example I was heated for 8 hours at 200° C. After cooling, the product appeared as a hard and brittle resin, colored brown and melting at from 100° to 120° C. This resin was slightly soluble in hot carbon tetrachloride and in hot ethanol. Analysis by acetylation indicated the presence of 0.732 equivalents of phenol per 100 grams which indicates that the rearrangement led essentially to the formation of structural components of the Type III, containing or having a theoretical content of 0.715 equivalents of phenol per 100 grams. The infra-red spectrum was in accordance with the structures indicated and manifested, in particular, absorption bands at 820 and 880 cm.$^{-1}$. These are characteristic of a trisubstitution-1,2,4 of the aromatic nuclei.

While the invention has been described hereinabove in terms of a number of examples of the process thereof, the invention itself is not limited thereto, but rather comprehends all modifications of and departures from those examples properly falling within the spirit and scope of the appended claims.

We claim:
1. A method for isometrically rearranging polyethers of the general formula:

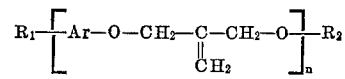

wherein (a) Ar is a divalent radical having at least one aromatic nucleus and which is a moiety of a diphenol of the form HO—Ar—OH, in which at least one ortho or para position with respect to each OH function is not substituted (b) $R_1$ represents a member of the group consisting of

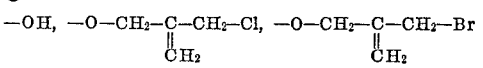

and

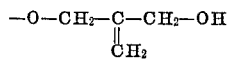

(c) $R_2$ represents a member of the group consisting of

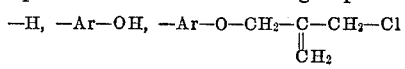

and

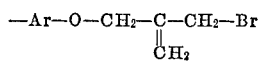

(d) $n$ is an integer in the range from about 2 to 30, which method comprises heating said polyether to a temperature in the range from about 150°–300° C. to produce an isomeric rearrangement thereof and thereafter recovering the polyphenols produced thereby.

2. A method according to claim 1 wherein Ar represents a radical of the group consisting of catechol, resorcinol, hydroquinone and a 4-4-dihydroxy diphenyl alkane.

3. A method according to claim 1 wherein the polyether to be isomerically rearranged is one in which Ar is a moiety of bisphenol-A, the isomeric rearrangement of which forms a compound having a structure which conforms to the following formulas:

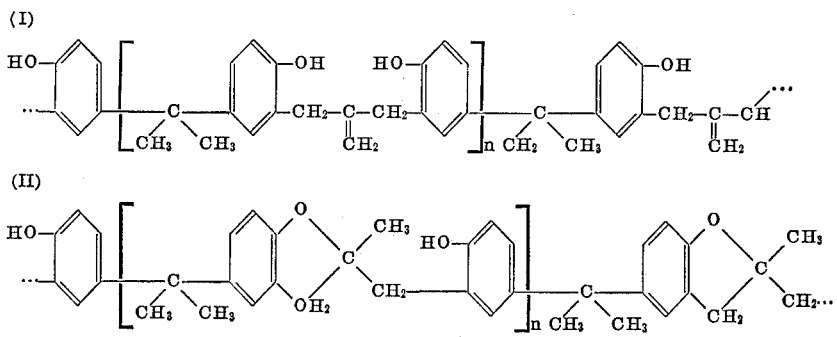

References Cited

UNITED STATES PATENTS 2,548,704  4/1951  Coleman et al. _____ 260—346.2
3,294,746  12/1966  Farnham _____ 260—47

JOSEPH L. SCHOFER, Primary Examiner

C. A. HENDERSON, Jr., Assistant Examiner

U.S. Cl. X.R.

156—327; 161—182, 268; 260—2, 30.2, 32.8, 33.4, 33.6, 619

PO-1050
(5/69)

UNITED STATES PATENT OFFICE
CERTIFICATE OF CORRECTION

Patent No. 3,497,470        Dated February 24, 1970

Inventor(s) Arsene Isard and Francis Weiss

It is certified that error appears in the above-identified patent and that said Letters Patent are hereby corrected as shown below:

Column 2, formula at the bottom of page 1 "(I)" should read --(II)--.

Column 6, line 2, "isometrically" should read --isomerically--

SIGNED AND
SEALED
JUL 14 1970

(SEAL)
Attest:

Edward M. Fletcher, Jr.
Attesting Officer

WILLIAM E. SCHUYLER, JR.
Commissioner of Patents